US012300925B2

(12) United States Patent
Wang et al.

(10) Patent No.: US 12,300,925 B2
(45) Date of Patent: May 13, 2025

(54) ELECTRICAL RECEPTACLE CONNECTOR

(71) Applicant: ADVANCED-CONNECTEK INC., New Taipei (TW)

(72) Inventors: Shu-Fen Wang, New Taipei (TW); Pin-Yuan Hou, New Taipei (TW); Chuan-I Lin, New Taipei (TW); Chao-Hsuan Cheng, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 379 days.

(21) Appl. No.: 17/988,284

(22) Filed: Nov. 16, 2022

(65) Prior Publication Data

US 2023/0163518 A1 May 25, 2023

(30) Foreign Application Priority Data

Nov. 19, 2021 (TW) ................................. 110143287

(51) Int. Cl.
*H01R 13/52* (2006.01)
*H01R 43/24* (2006.01)

(52) U.S. Cl.
CPC ......... *H01R 13/5219* (2013.01); *H01R 43/24* (2013.01)

(58) Field of Classification Search
CPC .......................... H01R 13/5219; H01R 13/521
See application file for complete search history.

(56) References Cited

U.S. PATENT DOCUMENTS

| | | | | |
|---|---|---|---|---|
| 4,335,932 | A * | 6/1982 | Herrmann, Jr. | H01R 43/24 174/541 |
| 2016/0104957 | A1* | 4/2016 | Kim | H01R 13/5219 439/78 |
| 2021/0119373 | A1* | 4/2021 | Xu | H01R 13/10 |
| 2023/0163518 | A1* | 5/2023 | Wang | H01R 13/405 439/271 |
| 2024/0039205 | A1* | 2/2024 | Li | H01R 13/5202 |

* cited by examiner

*Primary Examiner* — James Harvey
(74) *Attorney, Agent, or Firm* — Muncy, Geissler, Olds & Lowe, P.C.

(57) ABSTRACT

An electrical receptacle connector includes an insulated housing, a plurality of receptacle terminals, and a metallic shell. A hollow portion is between a first main body and a second main body of the base portion of the insulated housing, and body portions of the receptacle terminals penetrate the first main body and the second main body and are exposed out of the hollow portion. The metallic shell covers the insulated housing and covers the hollow portion to form an enclosed space in the hollow portion. The metallic shell has a potting hole corresponding to the enclosed space. When a sealing body is poured into the potting hole, the sealing body is provided between the insulated housing and the receptacle terminals and is also provided between the metallic shell and the insulated housing. Hence, waterproof function of the connector can be achieved.

9 Claims, 9 Drawing Sheets

ELECTRICAL RECEPTACLE CONNECTOR

CROSS-REFERENCE TO RELATED APPLICATION

This non-provisional application claims priority under 35 U.S.C. § 119(a) to patent application Ser. No. 110143287 in Taiwan, R.O.C. filed on Nov. 19, 2021, the entire contents of which are hereby incorporated by reference.

FIELD OF THE INVENTION

The instant disclosure relates to an electrical connector, and more particular to an electrical receptacle connector.

BACKGROUND

There are various transmission interfaces for the connectors; for example, HDMI transmission interface and Universal Serial Bus (USB) interface. Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). A USB type-C electrical receptacle connector known to the inventor includes flat terminals on the plastic housing, and the plastic housing is covered by a metal shell. In the USB type-C electrical receptacle connector, waterproof glues are applied at the end portion of plastic housing to achieve the waterproof function of the plastic housing and the metal shell. However, in such configuration, the moist can still enter the rear portion of the assembly of the plastic housing and the flat terminals from the front portion of the assembly of the plastic housing and the flat terminals. As a result, the moist will still leak into the internal space of the electronic product equipped with the connector, from the gap at the rear portion of the assembly of the plastic housing and the flat terminals and through the gap at the front portion of the assembly of the plastic housing and the flat terminals. In other words, the moist entering the internal space of the electronic product would cause the circuit board in the internal space of the electronic product to be damp, thus affecting the operation of the electronic product.

According to one or some embodiments, an electrical receptacle connector is provided. The electrical receptacle connector comprises an insulated housing, a plurality of receptacle terminals, and a metallic shell. The insulated housing comprises a base portion and a tongue portion. The base portion has a first main body, a second main body, and a hollow portion. One end of the tongue portion extends outwardly from one side of the first main body, and the hollow portion is between the first main body and the second main body. The receptacle terminals are held at the base portion and the tongue portion. Each of the contact portions extends from one of two ends of a corresponding one of the body portions, and the contact portions are on two faces of the tongue portion. Each of the tail portions extends from the other end of the corresponding one of the body portion and protrudes out of the second main body. The body portions penetrate through the first main body and the second main body, and the body portions are exposed out of the hollow portion. The metallic shell comprises a receiving cavity and an insertion opening in communication with the receiving cavity. The metallic shell covers the insulated housing. The metallic shell covers the hollow portion to form an enclosed space at the hollow portion. The metallic shell has a potting hole corresponding to the enclosed space.

In some embodiments, the end of the tongue portion is exposed out of the insertion opening. The electrical receptacle connector further comprises a sealing body in the enclosed space to fill the hollow portion. The sealing body encloses surfaces of the receptacle terminals at the hollow portion, and the sealing body is provided at a space among the metallic shell, the first main body, and the second main body.

In some embodiments, the metallic shell comprises a ventilation hole corresponding to the enclosed space and sealed by the sealing body.

In some embodiments, the base portion has a guide bevel corresponding to the potting hole and the ventilation hole.

In some embodiments, at least one ventilation hole is formed on the first main body, or the second main body, or both the first main body and the second main body.

In some embodiments, the electrical receptacle connector further comprises an outer shell at the metallic shell to cover the potting hole.

In some embodiments, the potting hole and the ventilation hole are at a same plane of the metallic shell.

In some embodiments, the electrical receptacle connector further comprises a grounding sheet. The grounding sheet is at the insulated housing and between the receptacle terminals which are arranged into two rows. Two legs are at two sides of the grounding sheet and penetrate through the first main body and the second main body.

In some embodiments, the electrical receptacle connector further comprises a stepped portion between a root portion of the tongue portion and the first main body.

Based on the above, according to one or some embodiments of the instant disclosure, the insulated housing has the hollow portion between the first main body and the second main body, and the body portions of the receptacle terminals are exposed out of the hollow portion. Moreover, the metallic shell out of the insulated housing has the potting hole, the metallic shell covers the hollow portion to form the enclosed space in the hollow portion, the potting hole corresponds to the enclosed space, and the sealing body is filled in to the potting hole. Therefore, the sealing body is provided between the insulated housing and the receptacle terminals and is also provided between the metallic shell and the insulated housing. Hence, waterproof function of the connector can be achieved.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
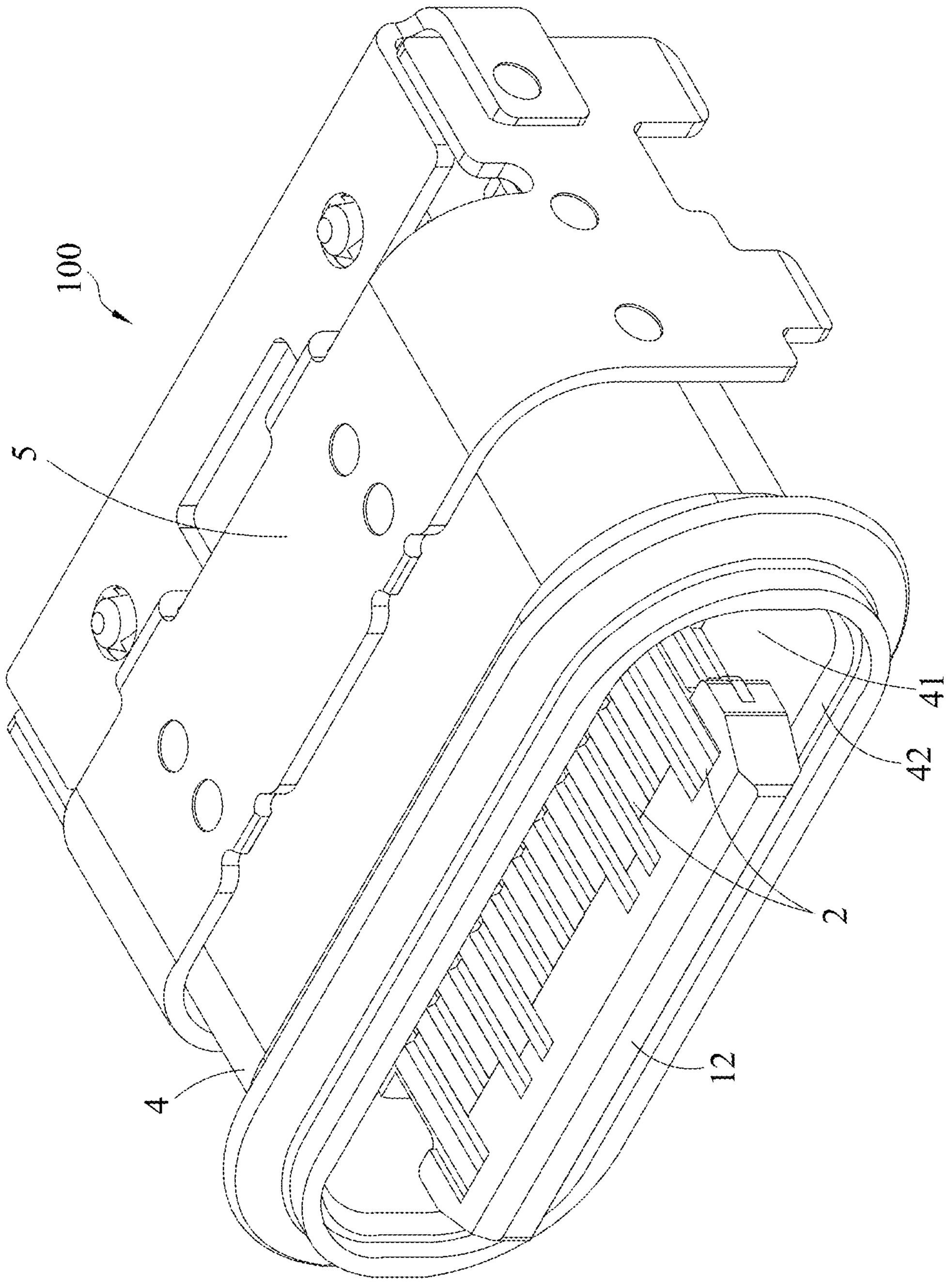
FIG. 1 illustrates a perspective view of an electrical receptacle connector according to some embodiments of the instant disclosure.
Figure 2:
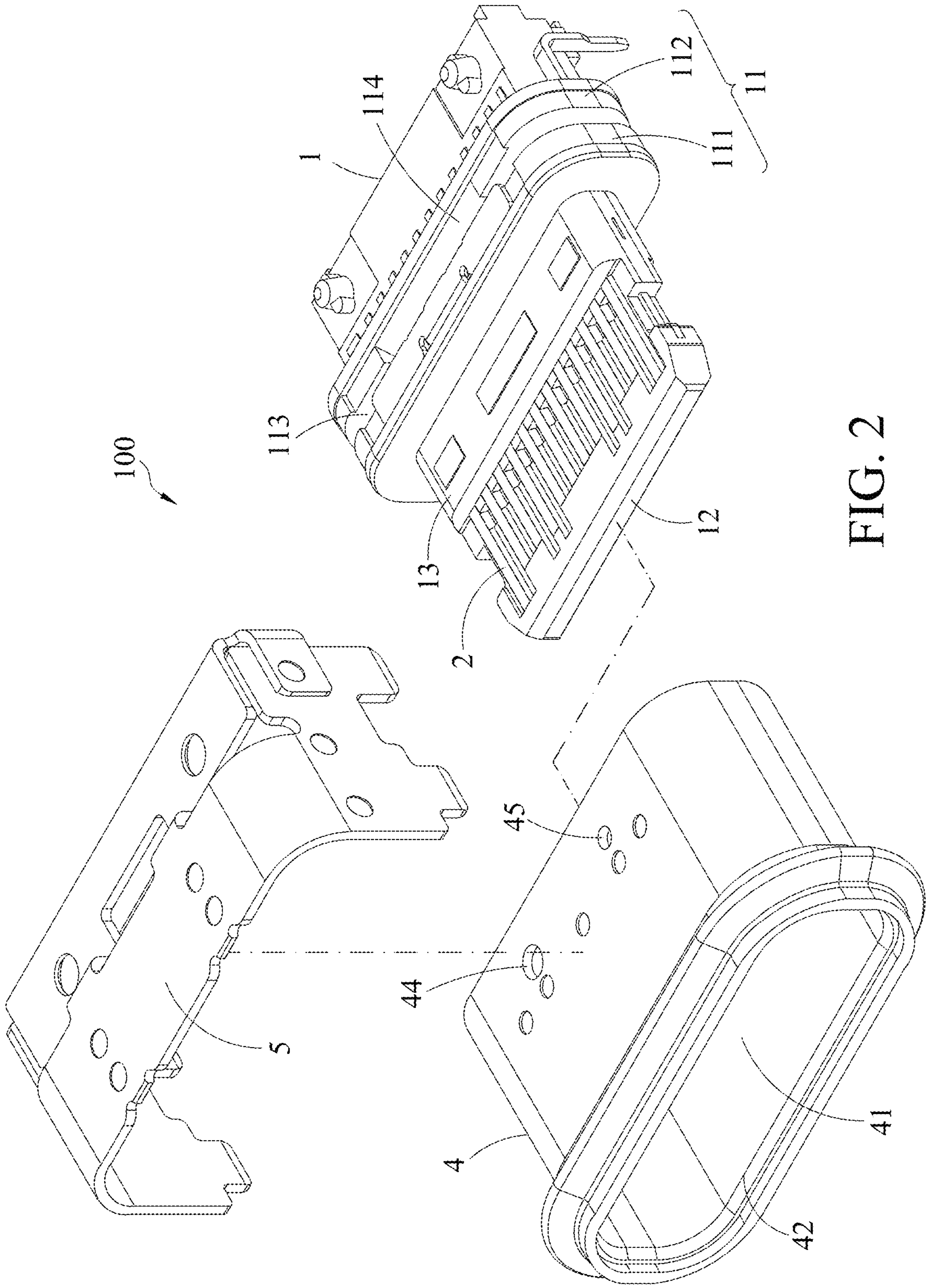
FIG. 2 illustrates an exploded view of the electrical receptacle connector according to some embodiments of the instant disclosure.
Figure 3:
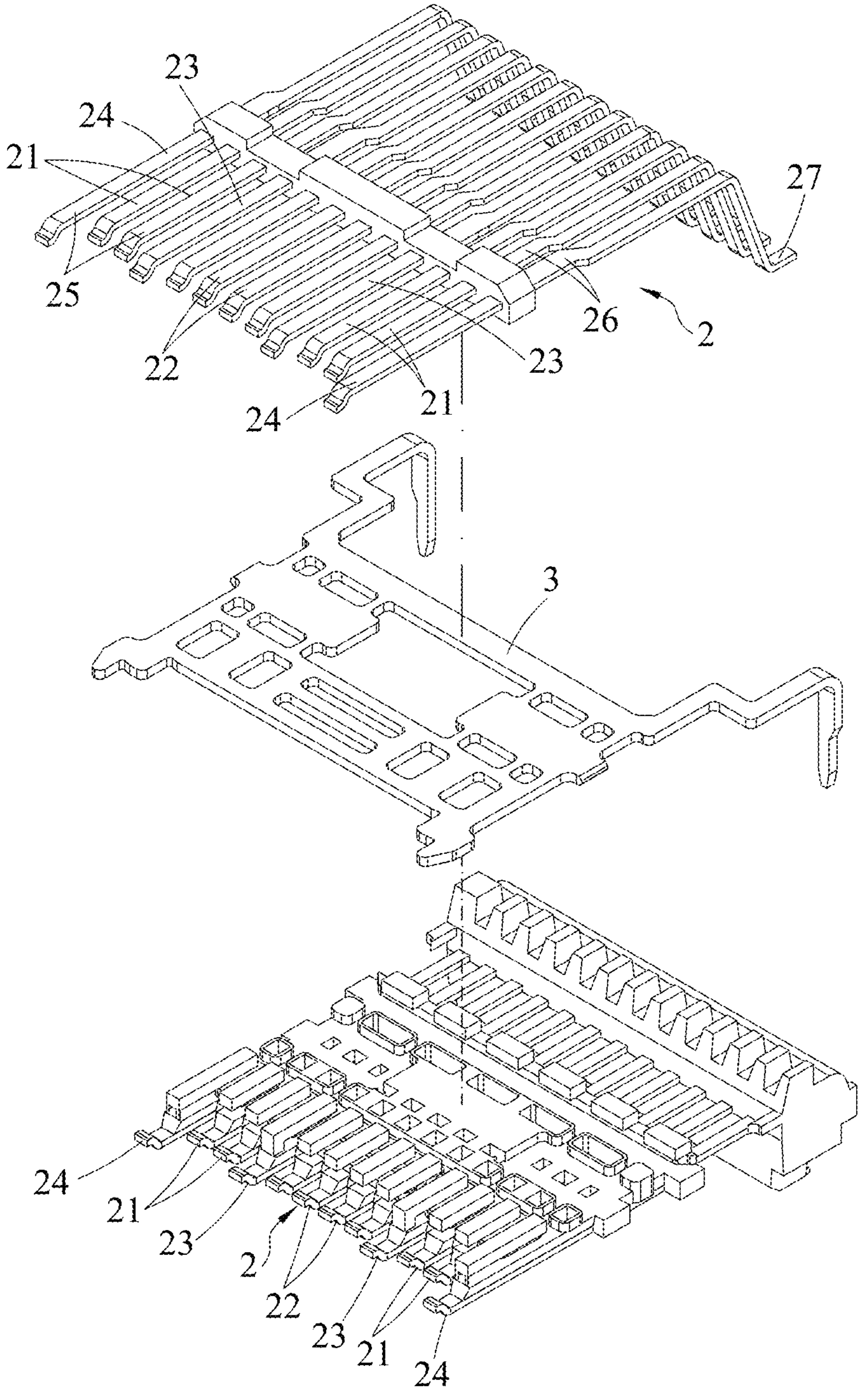
FIG. 3 illustrates an exploded view of the receptacle terminals and the grounding sheet of the electrical receptacle connector according to some embodiments of the instant disclosure.

Please refer to FIG. 1 to FIG. 3. FIG. 1 illustrates a perspective view of an electrical receptacle connector 100 according to some embodiments of the instant disclosure. FIG. 2 illustrates an exploded view of the electrical receptacle connector 100 according to some embodiments of the instant disclosure. FIG. 3 illustrates an exploded view of the receptacle terminals 2 and the grounding sheet 3 of the electrical receptacle connector 100 according to some embodiments of the instant disclosure. In some embodiments, the electrical receptacle connector 100 is in accordance with the specification of USB type-C connection interfaces, but embodiments are not limited thereto. In some embodiments, the electrical receptacle connector 100 may be in accordance with the specification of HDMI connection interfaces. In this embodiment, the electrical receptacle connector 100 comprises an insulated housing 1, a plurality of receptacle terminal 2, and a metallic shell 4.

Figure 10:
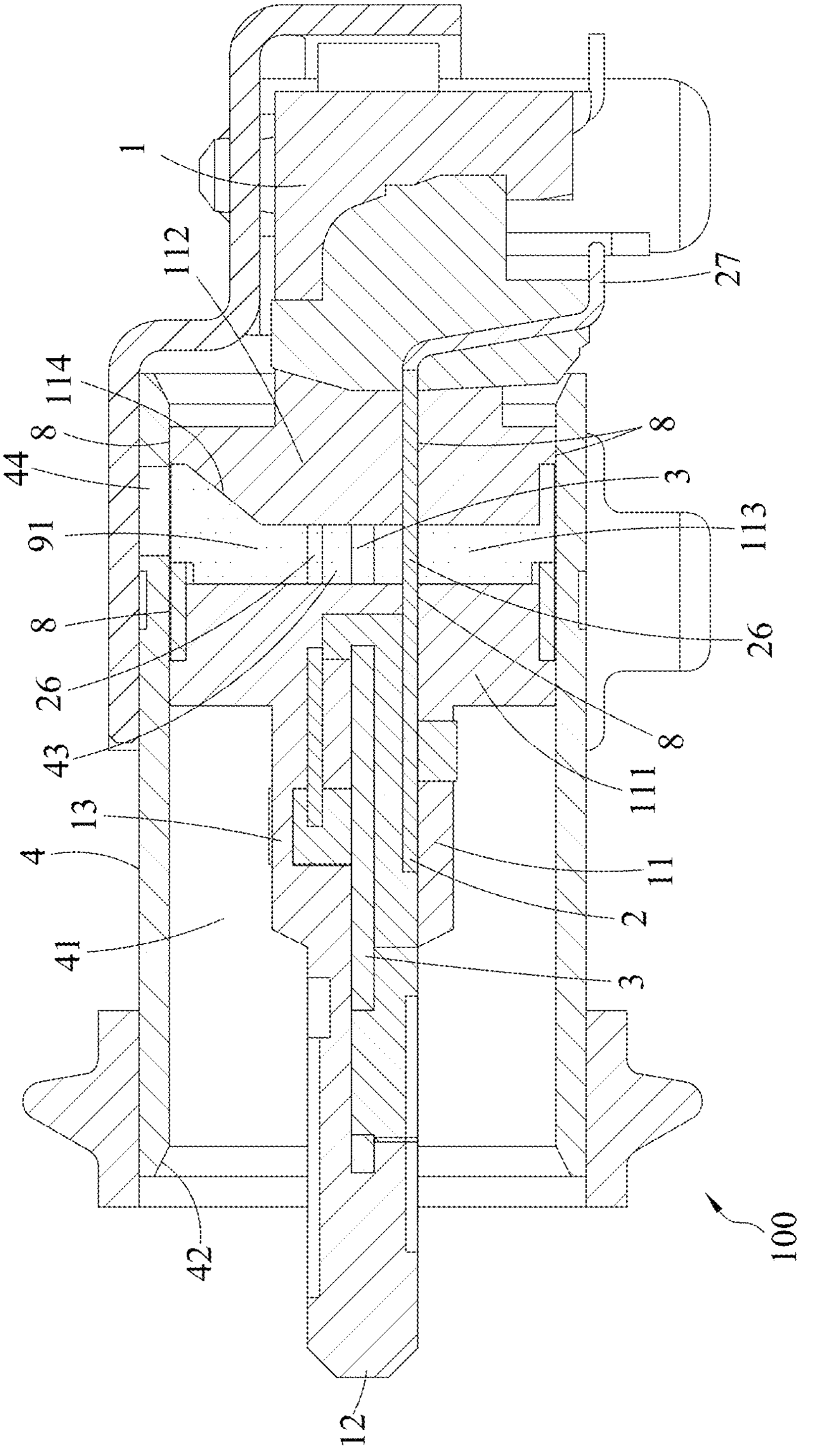
FIG. 10 illustrates a schematic cross-sectional view of the electrical receptacle connector according to some embodiments of the instant disclosure.

The insulated housing 1 comprises a base portion 11 and a tongue portion 12. The base portion 11 has a first main body 111, a second main body 112, and a hollow portion 113. One end of the tongue portion 12 extends outwardly from one side of the base portion 11, and the hollow portion 113 is between the first main body 111 and the second main body 112 (as shown in FIG. 10).

The receptacle terminals 2 are held at the base portion 11 and the tongue portion 12. Each of the receptacle terminals 2 comprises a contact portion 25, a body portion 26, and a tail portion 27. Each of the contact portions 25 extends from one of two ends of a corresponding one of the body portions 26, and the contact portions 25 are at the two faces (the upper face and the lower face) of the tongue portion 12. Each of the tail portions 27 extends from the other end of the corresponding one of the body portions 26 and protrudes out of the second main body 112. The body portions 26 penetrate through the first main body 111 and the second main body 112 and are exposed out of the hollow portion 113 (as shown in FIG. 10).

The metallic shell 4 comprises a receiving cavity 41 and an insertion opening 42 in communication with the receiving cavity 41. The metallic shell 4 covers the insulated housing 1, and the metallic shell 4 covers the hollow portion 113 to form an enclosed space 43 at the hollow portion 113. The metallic shell 4 has a potting hole 44, and the potting hole 44 corresponds to the enclosed space 43.

Figure 7:
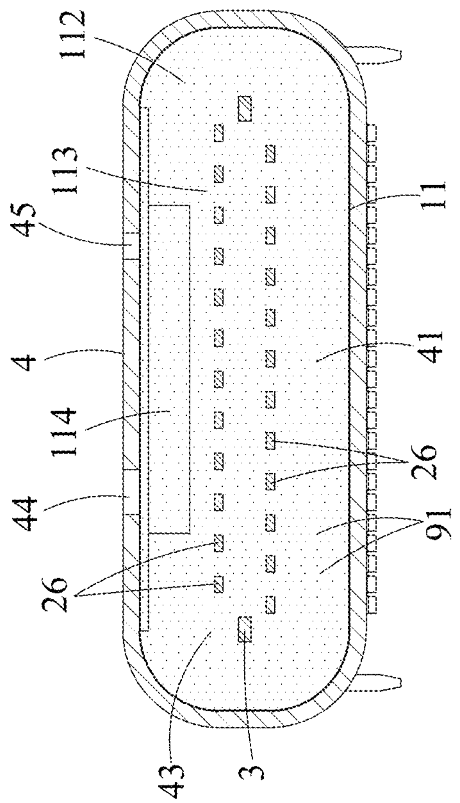
FIG. 7 illustrates a schematic cross-sectional view from a viewing angle same as FIG. 5, showing that the sealing body is filled into the enclosed space.
Figure 9:
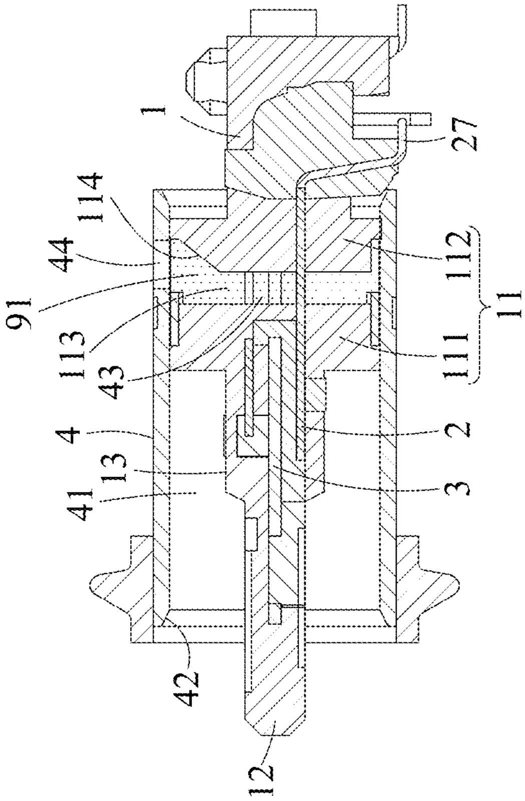
FIG. 9 illustrates a schematic cross-sectional view from a viewing angle same as FIG. 8, indicating that the sealing body is filled into the enclosed space.
Figure 8:
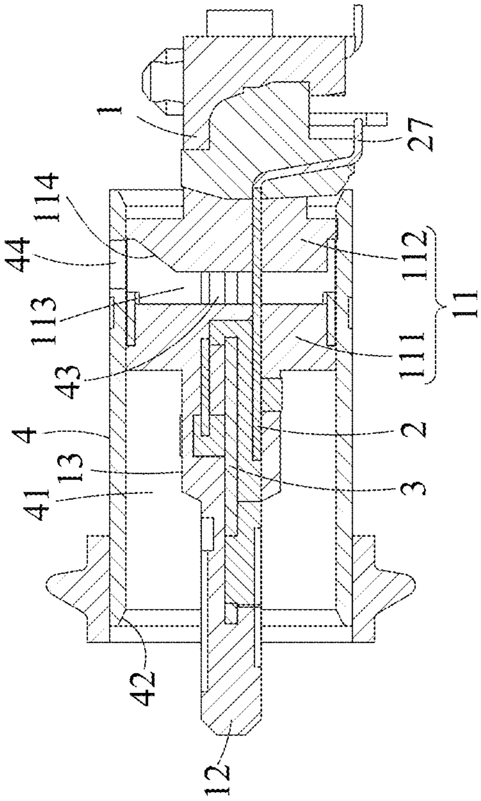
FIG. 8 illustrates a schematic cross-sectional view along the line B-B shown in FIG. 5, indicating that the sealing body is not filled into the enclosed space.

In this embodiment, the electrical receptacle connector 100 further comprises a sealing body 91 (as indicated by the dotted regions shown in FIG. 5, FIG. 7, FIG. 8, and FIG. 10). When the metallic shell 4 is assembled outside the insulated housing 1, the sealing body 91 in liquid state may be poured from the potting hole 44 (FIG. 6 and FIG. 8 illustrate that the sealing body 91 is not poured into the potting hole 44; FIG. 7 and FIG. 9 illustrate that the sealing body 91 is already poured into the potting hole 44). The sealing body 91 in liquid state is dried to form the sealing body 91 (which is a glue block). The sealing body 91 is in the enclosed space 43 to fill the hollow portion 113. The sealing body 91 encloses surfaces of the receptacle terminals 2 at the hollow portion 113. The sealing body 91 is provided at a space among the metallic shell 4, the first main body 111, and the second main body 112, at a space (as the gap 8 shown in FIG. 10) between the insulated housing 1 and the receptacle terminals 2, and at a space (as the gap 8 shown in FIG. 10) between the metallic shell 4 and the insulated housing 1. The sealing body 91 is covered by the metallic shell 4 at the enclosed space 43 and not exposed from the metallic shell 4.

In some embodiments, the insulated housing 1 has a plurality of terminal grooves, and the receptacle terminals 2 are at the terminal grooves and penetrate the base portion 11 and the tongue portion 12; however, embodiments are not limited thereto. In some embodiments, the insulated housing 1 and the receptacle terminals 2 are integrally formed as a unitary member so as to be applied to a waterproof electrical receptacle connector 100. It should be noted that, the insert-molding technique, the over-molding technique, combinations of the two molding techniques, or other molding techniques are all within the scope of the term "integrally formed". Hence, in such embodiments, the insulated housing 1 is devoid the terminal grooves, and the receptacle terminals 2 directly penetrate the base portion 11 and the tongue portion 12. In the waterproof electrical receptacle connector 100, the terminal is made of metal and the insulated housing 1 is made of plastic, and these two materials have different thermal expansion coefficient. Hence, during processing the electrical receptacle connector 100, in the step of passing through the convention oven, gaps 8 will be generated between the terminals and the insulated housing 1. As a result, the electrical receptacle connector 100 cannot provide a proper waterproof function. Accordingly, the sealing body 91 of the foregoing embodiments is also applied to the electrical receptacle connector 100 having the insulated housing 1 integrally formed with the receptacle terminals 2, so that the sealing body 91 can be formed in the enclosed space 43 and can fill the gaps 8 between the components of the connector.

Figure 4A:
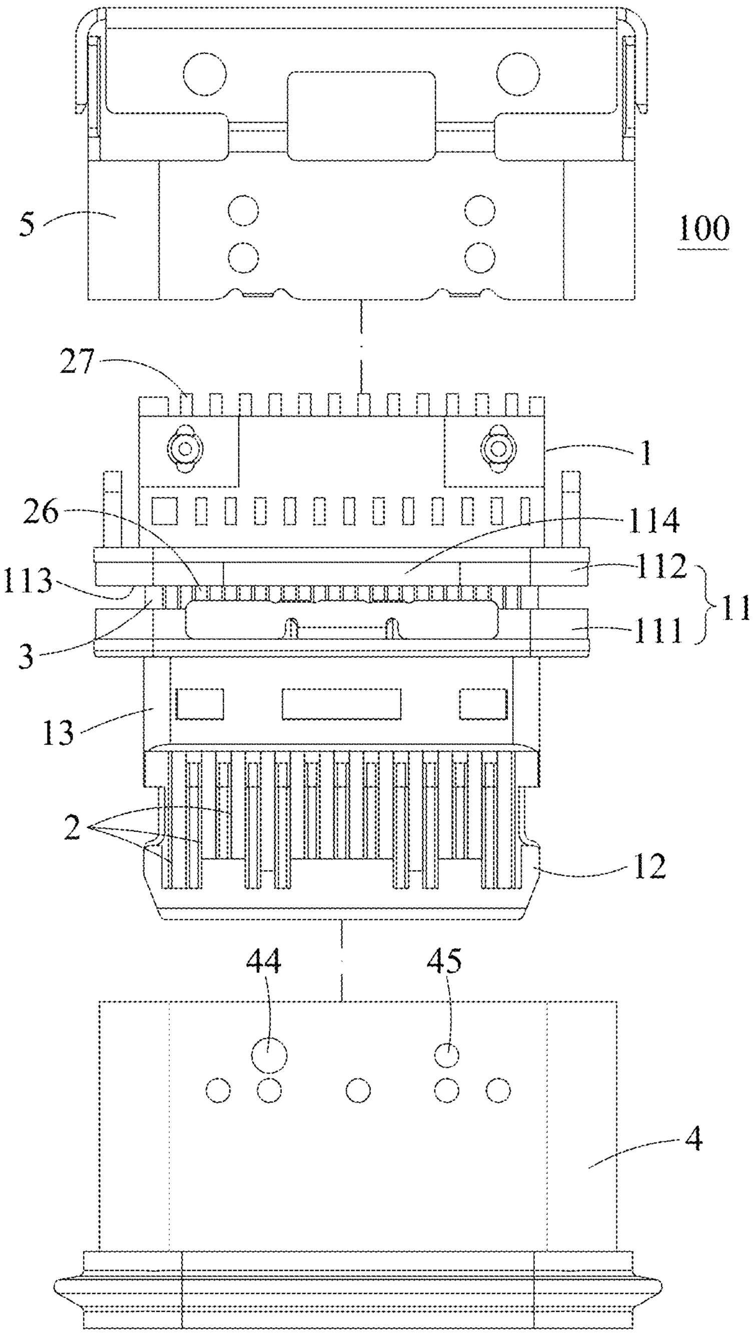
FIG. 4A illustrates a top exploded view of the electrical receptacle connector according to some embodiments of the instant disclosure, where the metallic shell includes a ventilation hole.
Figure 5:
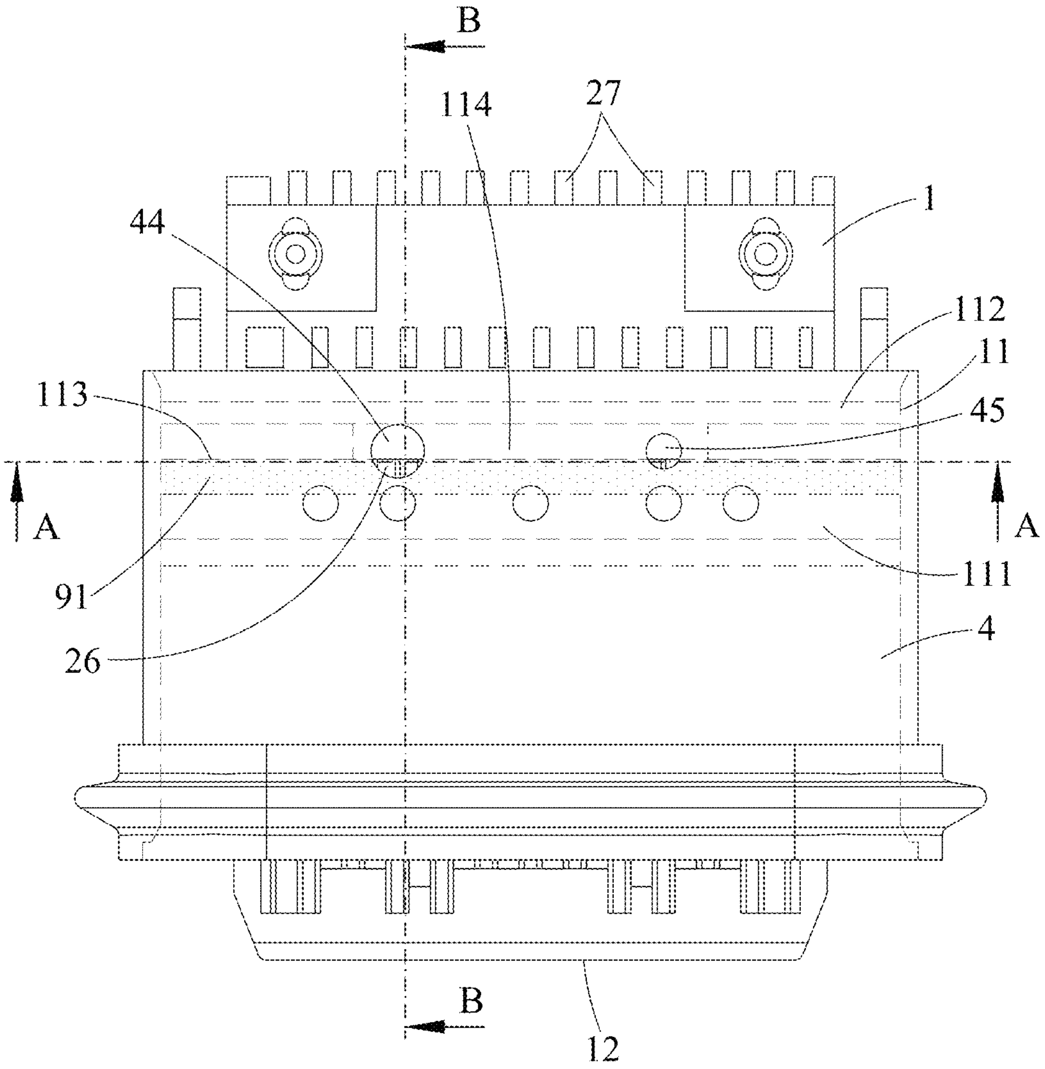
FIG. 5 illustrates a top view of the electrical receptacle connector according to some embodiments of the instant disclosure.
Figure 6:
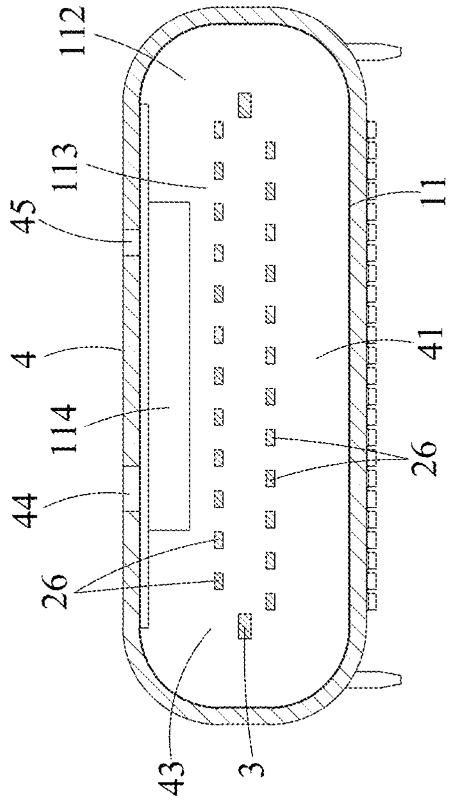
FIG. 6 illustrates a schematic cross-sectional view along the line A-A shown in FIG. 5, indicating that the sealing body is not filled into the enclosed space.

Please refer to FIG. 4A and FIG. 5. FIG. 4A illustrates a top exploded view of the electrical receptacle connector 100 according to some embodiments of the instant disclosure. FIG. 5 illustrates a top view of the electrical receptacle connector 100 according to some embodiments of the instant disclosure. In some embodiments, the base portion 11 has a guide bevel 114, and the potting hole 44 corresponds to the guide bevel 114. The guide bevel 114 is on the second main body 112 and faces the first main body 111. The guide bevel 114 allows the hollow portion 113 to have a wide opening, and the width of the opening of the hollow portion 113 is gradually reduced along an outside-in direction, thus facilitating the sealing body 91 in liquid state to flow into the hollow portion 113 conveniently (as shown in FIG. 9). In some embodiments, the guide bevel 114 is on the first main body 111 and faces the second main body 112.

Please refer to FIG. 5. In some embodiments, from a top view of the potting hole 44, a portion of the potting hole 44 corresponds to the guide bevel 114, and the other portion of the potting hole 44 corresponds to the hollow portion 113. When the sealing body 91 in liquid state is poured into the hollow portion 113 from the potting hole 44, parts of the sealing body 91 may flow into the hollow portion 113 along the guide bevel 114, while rest parts of the sealing body 91 may directly flow into the hollow portion 113 (as shown in FIG. 9). In some embodiments, the entire potting hole 44 completely corresponds to the hollow portion 113.

Please refer to FIG. 2 and FIG. 10. FIG. 10 illustrates a schematic cross-sectional view of the electrical receptacle connector 100 according to some embodiments of the instant disclosure. In some embodiments, the metallic shell 4 is a hollow shell, and the metallic shell 4 covers the insulated housing 1. The based portion of the insulated housing is disposed in the receiving cavity. The insertion opening 42 is formed at one end of the metallic shell 4 and the insertion opening 42 surrounds the tongue portion 12 (as shown in FIG. 10).

Please refer to FIG. 2 and FIG. 5. In some embodiments, the metallic shell 4 comprises a ventilation hole 45 (as shown in FIG. 4A). The ventilation hole 45 corresponds to the enclosed space 43 and sealed by the sealing body 91. The ventilation hole 45 corresponds to the guide bevel 114. The ventilation hole 45 and the potting hole 44 are at the top surface of the metallic shell 4. The diameter of the ventilation hole 45 is less than the diameter of the potting hole 44. In some embodiments, the potting hole 44 and the ventilation hole 45 are at the same plane of the metallic shell 4.

Please refer to FIG. 2 and FIG. 5. In some embodiments, from the top view of the ventilation hole 45, a portion of the ventilation hole 45 corresponds to the guide bevel 114, and the other portion of the ventilation hole 45 corresponds to the hollow portion 113. When the sealing body 91 in liquid state is poured into the enclosed space 43 from the potting hole 44, the sealing body 91 flows into the enclosed space 43, and at the same time the air inside the enclosed space 43 can be discharged outwardly from the ventilation hole 45. Therefore, the sealing body 91 can smoothly flow into the enclosed space 43 to fill up the enclosed space 43. In some embodiments, the entire ventilation hole 45 completely corresponds to the hollow portion 113.

Figure 4B:
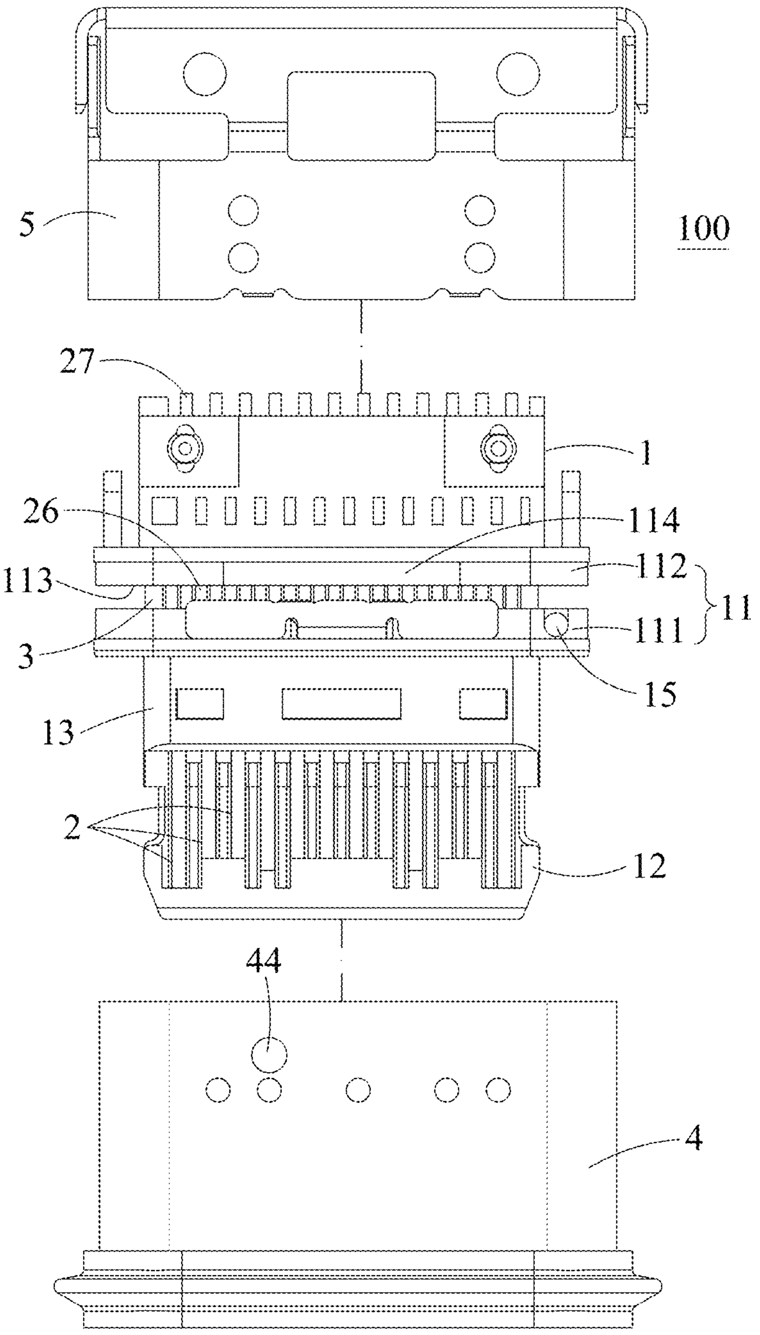
FIG. 4B illustrates a top exploded view of the electrical receptacle connector according to some embodiments of the instant disclosure, where at least one ventilation hole is formed on the first main body.

Please refer to FIG. 2. In some embodiments, at least one ventilation hole is formed on the first main body, or the second main body, or both the first main body and the second main body (for example, as shown in FIG. 4B, the first main body has a ventilation hole in communication with the hollow portion). When the sealing body in liquid state is poured into the enclosed space from the porting hole, the sealing body flows into the enclosed space, and at the same time the air inside the enclosed space can be discharged outwardly from the ventilation hole 15. Therefore, the sealing body 91 can smoothly flow into the enclosed space to fill up the enclosed space. In some embodiments, the electrical receptacle connector 100 further comprises a stepped portion 13 (as shown in FIG. 2). The stepped portion 13 is between a root portion of the tongue portion 12 and the first main body 111. The thickness of the stepped portion 13 is greater than the thickness of the tongue portion 12, and the thickness of the first main body 111 is greater than the thickness of the stepped portion 13.

Please refer to FIG. 1 and FIG. 2. In some embodiments, the electrical receptacle connector 100 further comprises an outer shell 5 covering the metallic shell 4 and also the potting hole 44. The outer shell 5 is fixed on the insulated housing 1 through buckling structures, and the outer shell 5 is fixed on the metallic shell 4 through several soldered spots by using laser soldering techniques, thereby increasing the adhesion force of the outer shell 5 on the metallic shell 4.

Please refer to FIG. 3. In some embodiments, the electrical receptacle connector 100 further comprises a grounding sheet 3. The grounding sheet 3 is at the insulated housing 3 and between the receptacle terminals 2 which arranged into two rows (as shown in FIG. 10). Two legs are at two sides of the grounding sheet 3, and the two legs penetrate through the first main body 111 and the second main body 112. As shown in FIG. 4A and FIG. 5, the legs are exposed from the hollow portion 113.

Please refer to FIG. 3. In some embodiments, buckle structures are at the two sides of the grounding sheet 3 and protrude from two sides of the tongue portion 12. The buckle structures are provided for being contacted by an electrical plug connector. Therefore, when the electrical plug connector is mated with the electrical receptacle connector 100, the hooks at two sides of the electrical plug connector are buckled with the buckle structures of the electrical receptacle connector 100. Hence, the hooks at the two sides of the electrical plug connector can be prevented from wearing against the two sides of the tongue portion 12 to cause the wearing and damaging of the tongue portion 12. In some embodiments, the grounding sheet 3 is held at the tongue portion 12 to increase the structural strength of the tongue portion 12 and to improve the shielding performance of the tongue portion 12. In some embodiments, when signals are transmitted between the terminals of the electrical plug connector and the receptacle terminals 2 of the electrical receptacle connector 100, the contact portions 25 of the receptacle terminals 2 of the electrical receptacle connector 100 can be isolated from each other by the grounding sheet 3 to reduce the crosstalk signal interferences upon signal transmission. Moreover, the grounding sheet 3 is at the tongue portion 12 to increase the structural strength of the tongue portion 12.

Please refer to FIG. 2, FIG. 4A, and FIG. 8. In some embodiments, the first main body 111 and the second main body 112 are separated plastic components. The first main body 111 and the second main body 112 are connected with each other through the body portions 26 of the receptacle terminals 2. The body portions 26 are at the hollow portion 113 and exposed from the hollow portion 113.

Please refer to FIG. 3. In some embodiments, the receptacle terminals 2 and several terminal organizers are insert-molded with each other to form a terminal module, and the grounding sheet 3 is assembled between the terminal organizers. Then, plastic components are formed outside the terminal module to form the insulated housing 1 (as shown in FIG. 2).

Please refer to FIG. 3, FIG. 6, and FIG. 8. In some embodiments, the receptacle terminals 2 comprise a plurality of high-speed signal terminals 21, a plurality of low-speed signal terminals 22, a plurality of power terminals 23, and a plurality of ground terminals 24. The ground terminals 24 are at two outermost sides of the power terminals 23. The low-speed signal terminals 22 are between the power terminals 23. Each of the high-speed signal terminals 21 is between an adjacent one of the power terminals 23 and an adjacent one of the ground terminals 24. One end of each of the receptacle terminals 2 is exposed out of the insertion opening 42 of the metallic shell 4 (as shown in FIG. 1).

Please refer to FIG. 1 and FIG. 10. In some embodiments, the length of the metallic shell 4 is reduced to allow the exposure of the tongue portion 12, and the tongue portion 12 is exposed out of the insertion opening 42.

Based on the above, according to one or some embodiments of the instant disclosure, the insulated housing has the hollow portion between the first main body and the second main body, and the body portions of the receptacle terminals are exposed out of the hollow portion. Moreover, the metallic shell out of the insulated housing has the potting hole, the metallic shell covers the hollow portion to form the enclosed space in the hollow portion, the potting hole corresponds to the enclosed space, and the sealing body is filled in to the potting hole. Therefore, the sealing body is provided between the insulated housing and the receptacle terminals and is also provided between the metallic shell and the insulated housing. Hence, waterproof function of the connector can be achieved.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

an insulated housing comprising a base portion and tongue portion, wherein the base portion has a first main body, a second main body, and a hollow portion; one end of the tongue portion extends outwardly from one side of the first main body; the hollow portion is between the first main body and the second main body;

a plurality of receptacle terminals held at the base portion and the tongue portion, wherein each of the receptacle terminals comprises a contact portion, a body portion, and a tail portion; each of the contact portions extends from one of two ends of a corresponding one of the body portions and the contact portions are on two faces of the tongue portion, each of the tail portions extends from the other end of the corresponding one of the body portions and protrudes out of the second main body; the body portions penetrate through the first main body and the second main body and are exposed out of the hollow portion; and a metallic shell comprising a receiving cavity and an insertion opening in communication with the receiving cavity, wherein the metallic shell covers the insulated housing, and the metallic shell covers the hollow portion to form an enclosed space at the hollow portion; the metallic shell has a potting hole corresponding to the enclosed space.

2. The electrical receptacle connector according to claim 1, wherein the end of the tongue portion is exposed out of the insertion opening; the electrical receptacle connector further comprising a sealing body in the enclosed space to fill the hollow portion; the sealing body encloses surfaces of the receptacle terminals at the hollow portion, and the sealing body is provided at a space among the metallic shell, the first main body, and the second main body.

3. The electrical receptacle connector according to claim 2, wherein the metallic shell comprises a ventilation hole corresponding to the enclosed space and sealed by the sealing body.

4. The electrical receptacle connector according to claim 3, wherein the base portion has a guide bevel corresponding to the potting hole and the ventilation hole.

5. The electrical receptacle connector according to claim 1, wherein at least one ventilation hole is formed on the first main body, or the second main body, or both the first main body and the second main body.

6. The electrical receptacle connector according to claim 1, further comprising an outer shell at the metallic shell to cover the potting hole.

7. The electrical receptacle connector according to claim 3, wherein the potting hole and the ventilation hole are at a same plane of the metallic shell.

8. The electrical receptacle connector according to claim 1, further comprising a grounding sheet, wherein the grounding sheet is at the insulated housing and between the receptacle terminals which are arranged into two rows; two legs are at two sides of the grounding sheet, and the two legs penetrate through the first main body and the second main body.

9. The electrical receptacle connector according to claim 1, further comprising a stepped portion between a root portion of the tongue portion and the first main body.

* * * * *